(12) United States Patent
Popovic et al.

(10) Patent No.: US 8,888,180 B2
(45) Date of Patent: Nov. 18, 2014

(54) DISPOSABLE AUTOMOBILE SEAT COVER

(75) Inventors: Maryann Popovic, Yonkers, NY (US); Andre Guarascio, Bronx, NY (US)

(73) Assignee: SeetSaver, Inc., Yonkers, NY (US)

( * ) Notice: Subject to any disclaimer, the term of this patent is extended or adjusted under 35 U.S.C. 154(b) by 179 days.

(21) Appl. No.: 13/488,864

(22) Filed: Jun. 5, 2012

(65) Prior Publication Data

US 2013/0009433 A1    Jan. 10, 2013

Related U.S. Application Data

(60) Provisional application No. 61/505,287, filed on Jul. 7, 2011.

(51) Int. Cl.
| | |
|---|---|
| *A47C 31/00* | (2006.01) |
| *B60N 2/60* | (2006.01) |
| *A47C 31/11* | (2006.01) |
| *B60N 2/28* | (2006.01) |

(52) U.S. Cl.
CPC .............. *B60N 2/60* (2013.01); *A47C 31/113* (2013.01); *A47C 31/116* (2013.01); *B60N 2/2881* (2013.01)
USPC ................................................... 297/219.12

(58) Field of Classification Search
CPC ...... A47C 31/113; A47C 31/116; A47C 31/00
USPC .................................................. 297/219.12
See application file for complete search history.

(56) References Cited

U.S. PATENT DOCUMENTS

| | | | |
|---|---|---|---|
| 4,883,701 A | 11/1989 | Rankin et al. | |
| 4,885,200 A | 12/1989 | Perdelwitz, Jr. et al. | |
| 4,891,454 A | 1/1990 | Perdelwitz, Jr. et al. | |
| 7,537,284 B1* | 5/2009 | Antorcha ............ | 297/219.12 X |
| 7,677,661 B1* | 3/2010 | Ferrari-Cicero et al. .............. | 297/219.12 X |
| 7,748,780 B2 | 7/2010 | Sizemore | |
| 7,754,939 B2 | 7/2010 | Yoshida et al. | |
| 7,914,075 B2 | 3/2011 | Danziger | |
| 7,967,804 B2 | 6/2011 | Ishikawa | |
| 2007/0085391 A1* | 4/2007 | Pines et al. ........... | 297/219.12 X |
| 2008/0136231 A1* | 6/2008 | Doherty ............... | 297/219.12 X |

* cited by examiner

*Primary Examiner* — Anthony D Barfield
(74) *Attorney, Agent, or Firm* — Lackenbach Siegel, LLP

(57) ABSTRACT

A disposable seat cover for a child safety seat includes an upper sheet, a lower sheet and upwardly curved pocket formed by the upper sheet for receiving a kidney shaped absorbent pad, the upper sheet having front flaps that are selectively overlapped and adhesively secured to form an upwardly disposed crotch portion juxtaposed to the pocket and the absorbent pad. The seat cover is adhesively or frictionally held to the child safety seat, side elements members and a fold construction provide universal conformance to the seat and for the occupant.

9 Claims, 3 Drawing Sheets

DISPOSABLE AUTOMOBILE SEAT COVER

PRIOR RELATED APPLICATIONS

This application is a non-provisional application and claims priority to provisional application 61/505,287, filed Jul. 7, 2011, which application is incorporated herein in its entirety by reference thereto.

BACKGROUND OF THE INVENTION

1. Field of the Invention

This invention relates to protective seat covers. This invention more specifically relates to protective seat covers that are absorbent and disposable. This invention also specifically relates to disposable seat covers children's safety seats in automobiles and strollers. The invention also relates to a method of forming the seat cover.

2. Background and Discussion of the Prior Art

U.S. Pat. No. 4,883,701 to Rankin et al. ("Rankin"), U.S. Pat. No. 4,891,454, Perdelwitz, Jr. et al. ("Perdelwitz I") and U.S. Pat. No. 4,885,200, Perdelwitz, Jr. et al. ("Perdelwitz II") disclose liners for a child safety seat. Rankin, Perdelwitz I and II are pad constructions having a flat pad configured to and dimensionally co-extensively disposed within the enclosed sheets. Rankin, Perdelwitz I and II require extensive thermoplastic edge seal construction throughout including the centrally disposed seat belt slotways. These pad constructions were costly to manufacture, which militated against a practical disposable construction, and did not provide universal comfort for the differently sized children and differently contoured car or stroller safety seats.

The art desires a disposable child safety seat cover which is inexpensively constructed for practical disposability, and yet provides universal comfort for differently sized children in diversely contoured automobile and stroller safety seats. The art also desires a disposable child safety seat cover as aforesaid which effectively absorbs large volumes of liquid. The art further desires a disposable child safety seat as immediately aforesaid, wherein a spent absorbent insert may be readily replaced without undoing the safety straps or removing the child from the seat such as where the child is soundly sleeping during long transport periods.

SUMMARY OF THE INVENTION

The invention is, in one aspect, a disposable seat cover having an upper sheet, a lower sheet, and an absorbent insert disposed between the sheets disposed in a contoured pocket formed by the upper sheet.

The invention, in another aspect, is a disposable seat cover as aforesaid, including an upwardly disposed curved portion of the upper sheet forming a crotch portion disposed forwardly of the absorbent insert; the crotch portion being formed by and with the overlapping connection of the upper sheet front flaps.

The disposable seat cover, in a further embodiment, has an opening for ready removal and replacement of the liquid soaked absorbent insert. The absorbent insert is preferably kidney-shaped and has a forwardly disposed arcuate concave surface juxtaposed to the curved crotch portion.

The invention, in another aspect, is a method of in situ forming the seat cover on the safety seat.

DESCRIPTION OF THE PREFERRED EMBODIMENTS

Figure 1:
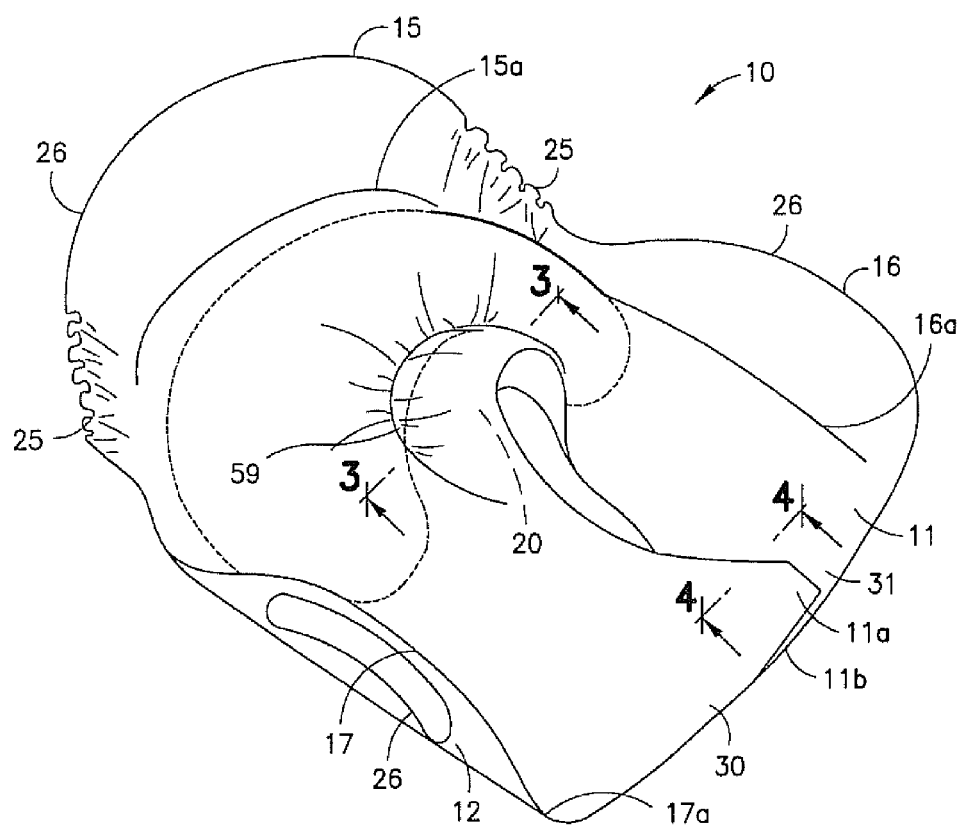
FIG. 1 is a front perspective view of the seat cover of the present invention.
Figure 3:
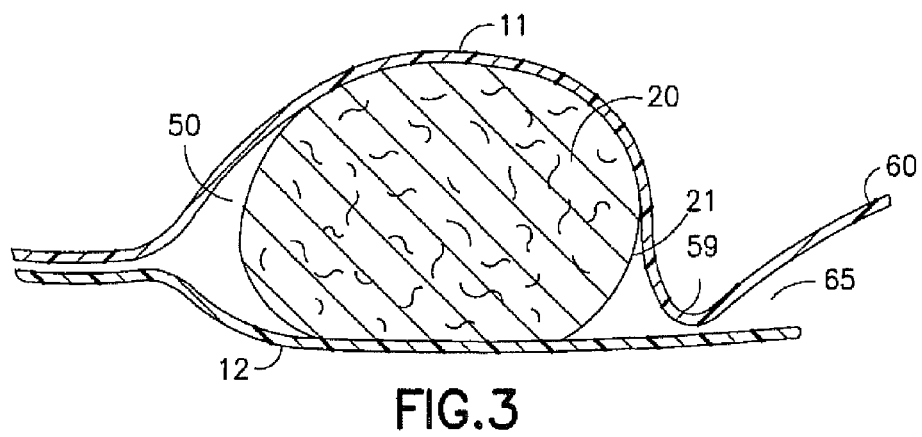
FIG. 3 is an enlarged sectional view taken along line 3-3 of FIG. 1.
Figure 4:
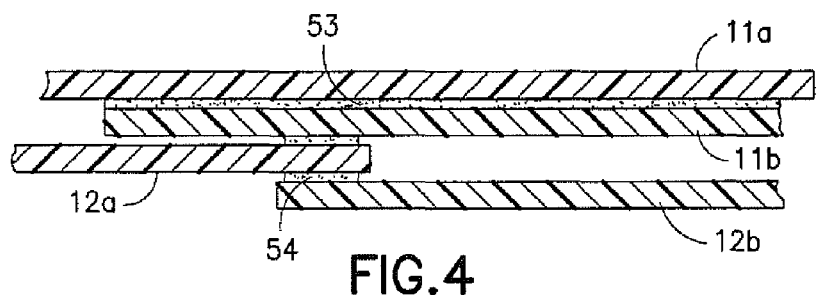
FIG. 4 is an enlarged sectional view taken along line 4-4 of FIG. 1.

Referring to FIGS. 1, 3 and 4, there is shown a first embodiment of the disposable seat cover 10. Cover 10 is formed of an upper sheet 11, a lower sheet 12 and a kidney shaped absorbent pad 20 disposed between the sheets in a pocket 50. Pocket 50 is provided by the upwardly curved or convex form of upper sheet 11.

Cover 10 has a back 15, facingly disposed sides 16 and 17, and a seat portion 41. Side folds 16a and 17a and back fold 15a allow sides 16 and 17 to be upwardly and facingly disposed, and back 15 is disposed upwardly between the sides. Elastic elements 25 are disposed between the respective sides 16 and 17 and back 15. In this manner of construction, cover 10 readily universally conforms to diversely sized and contoured seats and occupants. Pressure sensitive adhesive pads 26 (typical) are disposed on lower sheet 12 at the back 15, and respective sides 16 and 17 to selectively adhesively hold the cover in the seat in a desired conformed position. Sheets 11 and 12 are thermoplastically bonded at sides 16 and 17 and back 15 to provide a front opening 65 as further discussed hereinafter.

The upper sheet 11 includes front flaps 11a and 11b, and lower sheet 12 includes front flaps 12a and 12b. Lower sheet flaps 12a and 121b overlap slightly and are adhesively bonded at 52. Upper sheet flaps 11a and 11b overlap to a significantly greater degree than the lower flap construction (see FIG. 3). Upper sheet flaps 11a and 11b are selectively adhesively bonded at 53. The significant overlap of flaps 11a and 11b cause the upper sheet 11 to curve upwardly so as to form rearwardly disposed crotch portion 60. Crotch portion 60 has arcuate portion 61. Crotch portion 60 and flaps 11a, 11b, 12a and 12b form a space 65 for slidably receiving a seat belt (not shown). Upper sheet flaps 11a and 11b may be releasably adhesively bonded, whereas lower sheet flaps 12a and 12b may preferably be releasably or non-releasably bonded.

Absorbent kidney shaped pad insert 20 is disposed in upwardly convex contoured pocket 50. The kidney shaped insert 20 has a concave arcuate surface 21 which is facingly disposed to and retained in pocket 50 by crotch arcuate portion 61 adjacent opening 65.

The afore-discussed flap adhesive elements may be pressure sensitive releasable adhesives so that the pocket 50 is selectively openable at opening 65 to, if desired, remove and replace the spent pad 20 without removing the occupant or unbuckling the seat belt.

Figure 2:
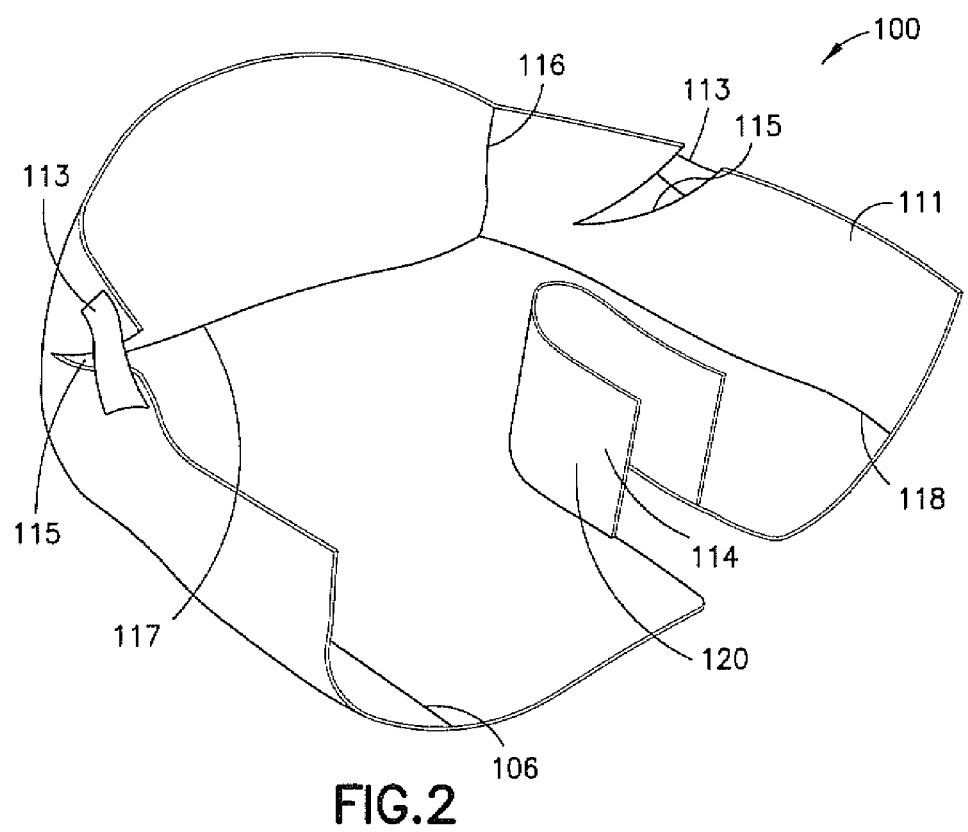
FIG. 2 is a front perspective view of a second embodiment seat cover of the present invention.

Referring specifically to FIG. 2, there is shown a second embodiment seat cover 100 of the present invention. Seat cover 100 includes upper sheet 110, lower sheet 111, upwardly disposed back 112, facingly disposed sides 116 and 117. Sheets 110 and 111 have closely facingly disposed front flaps 110a and 111b, which are upwardly disposed curved crotch portion 160. Upper sheet 110 is liquid permeable or absorbent, and lower sheet 111 may have a barrier backing, so that liquid passes through the upper sheet to the lower sheet and the occupant is thereby prevented from soiling the seat. Upper sheet 110 may be contoured as in embodiment 10 so as to hold a kidney shaped absorbent pad.

Sides 116 and 117 have V-notches 120 with adhesive tape 121 bridging the V-notch to form slots 130 for receiving a seat belt (not shown). Tape 121 has a pressure sensitive releasable adhesive to provide a selectively sized slot for adjustably securing a seat belt (not shown) so as to comfortably accommodate the occupant. It is within the contemplation of the present invention to provide the tape and slot construction of the second embodiment with the first embodiment construction.

The elastic gathering elements, sheeting, adhesive tape and absorbent pads may be constructed from and by means well-known in the disposable diaper art, as illustratively shown and described in U.S. Pat. No. 7,754,939, granted Jul. 13, 2010 to Yoshida et al.; U.S. Pat. No. 8,093,447, granted Jan. 10, 2012 to Sakagluchi; and U.S. Pat. No. 7,967,804, granted Jun. 28, 2011 to Ishikawa, which references are incorporated herein in their entireties by reference thereto.

The opposed front flaps may be pulled closed and held by adhesive tab elements common in the disposable diaper art, to form the curved crotch portion (FIG. 1). The crotch portion simultaneously provides a crotch retaining function and a kidney-shaped insert retaining function. The kidney-shaped absorbent insert may be readily inserted and removed from the pocket. This permits ready disposable of a spent insert with ready replacement of a dry insert. This particular functionality is most useful with a children's automobile car safety seat on long road trips where diaper change platforms and facilities are not immediately available. The absorbent insert may be replaced without unduly disturbing the child or undoing the seat belt.

It is also within the contemplation of the present invention that the upper sheet be a thermoplastic sheet readily transmits or transports liquid through the upper sheet to the pocket to be fully absorbed by the kidney shaped insert. The lower sheet has liquid barrier properties to prevent liquid from staining the safety seat. Such thermoplastic sheeting is well known in the art.

It is also within the contemplation of the present invention that the lower sheet be constructed of a polymer material having a pressure sensitive or friction adhesive feature to hold the seat cover to the fabric of an automobile or stroller safety seat. Such polymeric materials are well-known in the high polymer sheeting and adhesive arts.

It is also within the contemplation of the present invention that the upper and lower front flaps overlap in diverse modes, and the invention is not to be construed or limited to the specific sheet overlap construction shown and described herein.

Having illustrated and described the principles of our invention with reference to several preferred embodiments, it will be apparent to those of ordinary skill in the art that the invention may be modified in arrangement and detail without departing from such principles. For example, other suitable materials for the seat cover may be used in place of those described. In addition, the proportions and sizes may be varied from that shown and described above. Therefore, we claim as our invention all such modifications as come within the scope of the following claims.

What we claim is:

1. A disposable seat cover comprising:
a protective cover comprising sheeting having a front, a back and upwardly and facingly disposed sides, said sheeting comprising an upper sheet and a lower sheet comprising a centrally disposed pocket, and further comprising an absorbent insert disposed in said pocket, said insert being shaped in conformance with an upwardly disposed pocket, said upper sheet being liquid permeable for transferring liquid to the pocket and insert, each side comprise a forwardly disposed portion and a rearwardly disposed portion, and further comprising means for elastically holding the respective forwardly disposed portion to the rearwardly disposed portion being disposed between the respective portions; and means for removably holding the seat cover to a seat, said sheets comprising front flaps and means for selectively closing the flaps at the front to form a front opening adjacent to and in communication with the pocket, said upper sheet comprises an upwardly curved portion forming a crotch portion, said crotch portion being facingly disposed to the pocket adjacent the front opening, said crotch portion retains the insert in the pocket.

2. The disposable seat cover of claim 1, said insert being kidney-shaped, said kidney shaped insert having a forwardly disposed arcuate surface juxtaposed to said curved portion forming said crotch portion.

3. The seat cover of claim 1, said upper sheet comprises said front flaps, further comprising adhesive closure means disposed at the front to adhesively secure the upper overlapping flaps to form said rearwardly disposed raised curved crotch portion in the upper sheet.

4. A disposable seat cover comprising:
a protective cover comprising an upper sheet and a lower sheet comprising a front, sides and a back, said sheets being bonded at the sides and back, and said upper sheet being upwardly curved to provide a pocket, and said sheets comprising an opening between the sheets juxtaposed to the pocket;
each side comprise a forwardly disposed portion and a rearwardly disposed portion, and further comprising means for elastically holding the respective forwardly disposed portion to the rearwardly disposed portion being disposed between the respective portions, an insert comprising absorbent material, said insert being removably disposed in the pocket; and
means for removably attaching the seat cover to the seat portion of a seat, said upper sheet further comprises an upwardly curved portion defining a crotch portion, said crotch curved portion being juxtaposed to the pocket and the insert.

5. The seat cover of claim 4, said insert being kidney shaped, said kidney shaped insert having an forwardly disposed arcuate surface juxtaposed to said crotch curved portion forming said crotch.

6. The seat cover of claim 5, said upper sheet member comprises thermoplastic material that transmits liquid through the upper sheet to the pocket and is absorbed by the insert.

7. The seat cover of claim 6, said lower sheet member comprises liquid barrier properties.

8. A method of forming a seat cover in a child seat, said method comprises:
(a) providing a seat cover comprising;
an upper sheet; a lower sheet; and an absorbent pad disposed between the sheets, said upper sheet comprises facingly disposed flaps for selectively overlapping the front portions so as to form a rearwardly and upwardly disposed curved crotch portion;
(b) overlapping said upper sheet flaps to form said crotch portion;
(c) adhesively securing the flaps to retain said crotch portion;

further comprising:
- (d) removing the absorbent pad when spent, with the seat cover disposed onto the seat, and
- (e) replacing the spent absorbent pad with a fresh pad.

9. The method of claim 8, wherein prior to step (b), the step of frictionally holding the seat cover to the child seat.

\* \* \* \* \*